United States Patent
Heyn et al.

(10) Patent No.: US 9,212,718 B2
(45) Date of Patent: Dec. 15, 2015

(54) ADJUSTABLE DAMPING VALVE

(75) Inventors: Steffen Heyn, Niederwerrn (DE); Lothar Callies, Poppenhausen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 192 days.

(21) Appl. No.: 13/061,688

(22) PCT Filed: Jul. 9, 2009

(86) PCT No.: PCT/EP2009/058733
§ 371 (c)(1),
(2), (4) Date: Mar. 1, 2011

(87) PCT Pub. No.: WO2010/023021
PCT Pub. Date: Mar. 4, 2010

(65) Prior Publication Data
US 2011/0168935 A1 Jul. 14, 2011

(30) Foreign Application Priority Data
Sep. 1, 2008 (DE) .................. 10 2008 041 735

(51) Int. Cl.
*F16F 9/46* (2006.01)
*F16F 9/48* (2006.01)
*F16F 9/50* (2006.01)

(52) U.S. Cl.
CPC . *F16F 9/46* (2013.01); *F16F 9/465* (2013.01); *F16F 9/466* (2013.01); *F16F 9/48* (2013.01); *F16F 9/50* (2013.01)

(58) Field of Classification Search
CPC ............. F16F 9/46; F16F 9/465; F16F 9/466; F16F 9/48; F16F 9/483; F16F 9/50

USPC ............. 251/30.01–30.04; 188/282.2, 282.3, 188/322.15
See application file for complete search history.

(56) References Cited

U.S. PATENT DOCUMENTS

| 5,078,240 | A | * | 1/1992 | Ackermann et al. .......... 188/285 |
| 5,285,878 | A |   | 2/1994 | Scheffel |
| 5,303,804 | A | * | 4/1994 | Spiess .......................... 188/266.5 |
| 6,119,831 | A | * | 9/2000 | Knecht et al. ............... 188/282.2 |
| 6,435,210 | B1 | * | 8/2002 | Obersteiner et al. ...... 137/599.18 |

FOREIGN PATENT DOCUMENTS

| DE | 4418972 A1 | 7/1995 |
| DE | 198 22 448 C2 | 1/1999 |
| EP | 0492107 | 1/1992 |

* cited by examiner

*Primary Examiner* — John K Fristoe Jr.
*Assistant Examiner* — Ian Paquette
(74) *Attorney, Agent, or Firm* — Cozen O'Connor

(57) ABSTRACT

Adjustable damping valve for a vibration damper having a valve body having a pressure-loaded surface that acts in the lifting direction of the valve body and is impinged by an incident flow of damping medium from an opening inside a cross section limited by valve seat surface, and a surface operative in the closing direction is formed by a rear side of the valve body. A resulting force including a force of at least one valve spring and an actuating force of an actuator acts on the valve body. An additional surface of the valve body is pressure-loaded by damping medium by incident flow on the valve body in the closing direction of the valve body, or the valve body has a first pressure-loaded surface acting in the lifting direction, and a second pressure-loaded surface that acts in the lifting direction.

10 Claims, 4 Drawing Sheets

Prior Art

ADJUSTABLE DAMPING VALVE

PRIORITY CLAIM

This is a U.S. national stage of Application No. PCT/EP2009/058733, filed on Jul. 9, 2009, which claims priority to German Application No: 10 2008 041 735.1, filed: Sep. 1, 2008, the contents of which are incorporated herein by reference.

BACKGROUND OF THE INVENTION

1. Field of the Invention

The invention is directed to an adjustable damping valve.

2. Related Art

FIG. 1 shows as prior art an adjustable damping valve 1 for a vibration damper in a variant that can be fastened to a piston rod. The damping valve 1 comprises a housing 3 with a valve seat ring 5 which can be moved axially within limits. An axially movable valve body 9 is preloaded by a valve spring 11 in the closing direction on a valve seat surface 7 of the valve seat ring. The valve seat ring 5 is supported by its conical valve surface on a valve seat surface 12 on the housing side. The valve body 9 can slide axially in a stepped opening 13 of the housing and itself has an outer contour which is stepped 15 relative to a guide sleeve 17. At least one eccentric connection opening 19 connects an underside facing in direction of the valve seat surface 7 to a rear side of the valve body 9. Therefore, with an incident flow to the valve body through the valve seat ring 5, two pressure-loaded surfaces are available at the valve body 9. One pressure-loaded surface $A_{ÖD}$ acting in the lifting direction on the valve body 9 is defined by the inner diameter of the contact surface of the valve body 9 on the valve seat surface 7. The valve ring 5 remains in the indicated position because the surface $A_{ÖD}$ is greater than the diameter of the valve seat surface 12. A pressure force acts in the closing direction of the valve body 9 by way of the projected surface $A_{Schließ\beta D}$ with the diameter of the guide sleeve 17 and a pressure $p_Ö$ of the underside. The rear side of the valve body is acted upon by damping medium to achieve pressure equalization and accordingly so as to move the valve body using less energy. The pressure-loaded surface $A_{ÖD}$ is slightly larger than surface $A_{Schließ\beta D}$, wherein manufacturing deviations are taken into account in calculating the difference so that the valve body can lift more easily in a defined manner with the spring force in full effect.

A magnetic force acting counter to the spring force of the valve spring 11 can be introduced by means of a coil 21 in combination with an armature sleeve 23. With an incident flow to the valve body 9 through a through-opening 25 of the valve seat ring 5, the greatest damping force is achieved when the magnetic force equals zero and the full spring force of the valve spring 11 is available in the closing direction of the valve body 9. A particularly large opening pressure pÖ is then required at the underside of the valve body 9 for the lifting movement of the valve body 9.

When the coil 21 is energized to the maximum extent, the magnetic force at least partially compensates for the spring force of the valve spring 11 so that a lifting movement of the valve body 9 takes place already at an appreciably lower pressure $p_Ö$ at the surface $A_{ÖD}$.

For a second incident flow direction, the valve body 9 has a second annular surface $A_{ÖZ}$ to which pressure is applied in the opening direction and which is determined by the outer diameter in the area of a step 27 of the valve body 9 and the outer diameter of the contact surface of the valve ring 5 on the housing-side valve seat surface 12. With incident flow to the valve body 9 and valve seat ring 5 through at least one radial opening 29 in the housing 3, a lifting force acts on the annular surface $A_{ÖZ}$ against the spring force of the valve spring 11 and an annular pressure-loaded surface $A_{Schließ\beta Z}$ at the shoulder 15 of the valve body 9 which is supplied with pressure medium via a parallel channel 31 and acts in closing direction. Damping medium can flow into radial channels 37 of the valve body 9 through channel 31 via an annulus 33 between the shoulder 15 and the step 35 in the housing 3 and can act on a valve plunger 39 which is preloaded by the valve spring 11. The pressure on the valve plunger 39 acts as an opening force on the valve plunger 39 and as an additional closing force for the valve body 9 so that the valve plunger can lift easily from the valve body as the case may be. When the coil 21 is energized, the valve plunger 39 lifts slightly from the valve body 9 so that an annular gap is formed. However, the cross section of the at least one connection opening 19 is appreciably larger than this annular gap so that no pressure which could exert a closing force on the valve body 9 can build on the rear side of the valve body.

In the through-pass position of the damping valve, the damping medium can flow via the radial channels 29 through the gap between the valve seat ring 5 and the valve seat surface 12 on the housing side. As can be seen from the description, the pressure-loaded surfaces $A_Ö$ and $A_{Schließ\beta}$ are independent from one another, i.e., if surface $A_{Schließ\beta Z}$, for example, are enlarged at the shoulder 15, it would have no effect on the size of the pressure-loaded surface $A_{ÖD}$.

The ratio of maximum damping force to minimum damping force is referred to as a spread of the damping force characteristics of the adjustable damping valve. It has turned out in practice that the characteristic spread should be greater than before. A very simple possibility would be to use an appreciably higher preloading of the valve spring. However, a valve spring design of this type would also result in an increase in the required opening force in case of incident flow to the valve body from the radially outer side. But this operating behavior is undesirable.

SUMMARY OF THE INVENTION

It is an object of the present invention to increase the characteristic spread of the adjustable damping valve for only one incident flow direction of the valve body.

According to one embodiment of the invention, an additional surface of the valve body is pressure-loaded by damping medium in case of incident flow on the valve body via the opening in closing direction of the valve body.

In case of a different incident flow direction to the valve body, this additional closing surface does not operate as an additional closing surface. A closing force that must be overcome by the opening pressure is generated by the additional closing surface. A greater opening pressure means a greater achievable damping force. An appreciably enlarged spread between the softest and hardest damping force characteristics of the damping valve is achieved with the valve spring force and actuator force remaining the same.

In another advantageous embodiment, the additional pressure-loaded surface is connected to the through-pass opening by at least one channel connection.

The channel connection is carried out in the valve body. The channel connection could also be provided in the housing, but the manufacturing costs would typically be higher.

A throttle point is formed inside the channel connection for individually adapting the pressure level present at the pressure-loaded surface acting in the closing direction.

In order to achieve a valve body that is designed in a simple manner in its entirety, the additional pressure-loaded surface is formed by the shoulder of the valve body facing radially outward.

The shoulder of the valve body and the stepped opening form an annulus whose outlet is provided with another throttle point. The pressure level at the pressure-loaded surface can be determined by the additional throttle point.

To ensure a completely independent application of pressure to the valve body for different incident flow directions under all circumstances, the channel connection has a check valve which closes in the flow direction of the opening.

A very simple construction is achieved in that the valve body comprises two layered structural component parts between which a check valve disk is arranged so as to be axially movable.

In an alternative variant, the valve body has a first pressure-loaded surface acting in the lifting direction which is smaller than the surface that is pressure-loaded in the closing direction and at least a second pressure-loaded surface that acts in the lifting direction is acted upon by a pressure level that is reduced in comparison to the first pressure-loaded surface.

When the pressure-loaded surfaces acting in opposite directions are constructed on a virtually identical diameter, even the smallest manufacturing deviations suffice to influence the operating behavior of the damping valve. This sensitivity to manufacturing tolerances is substantially reduced by using two pressure-loaded surfaces at different pressure levels so that the lifting forces at the valve body can be adjusted very precisely by the dimensioning of the valve components.

In another advantageous embodiment, the second pressure-loaded surface acting in the lifting direction is connected by an inlet throttle to the through-opening supplying the first pressure-loaded surface with damping medium.

According to one embodiment, the at least one additional pressure-loaded surface is between an inner valve seat surface and an outer valve seat surface. No additional installation space is required in the housing for the additional pressure-loaded surface.

The additional pressure-loaded surface is formed by at least one annular groove and can be constructed directly in the valve seat surface or in the valve body.

An outlet throttle adjoins the additional pressure-loaded surface and offers a further adjustment possibility for determining the pressure level at the additional pressure-loaded surface.

For purposes of a uniform pressure level at the additional pressure-loaded surface, the inlet throttle and the outlet throttle are constructed so as to be offset in circumferential direction.

BRIEF DESCRIPTION OF DRAWINGS

The invention will be described in more detail referring to the following description of the drawings. In the drawings.

DETAILED DESCRIPTION OF THE DRAWINGS

Figure 1:
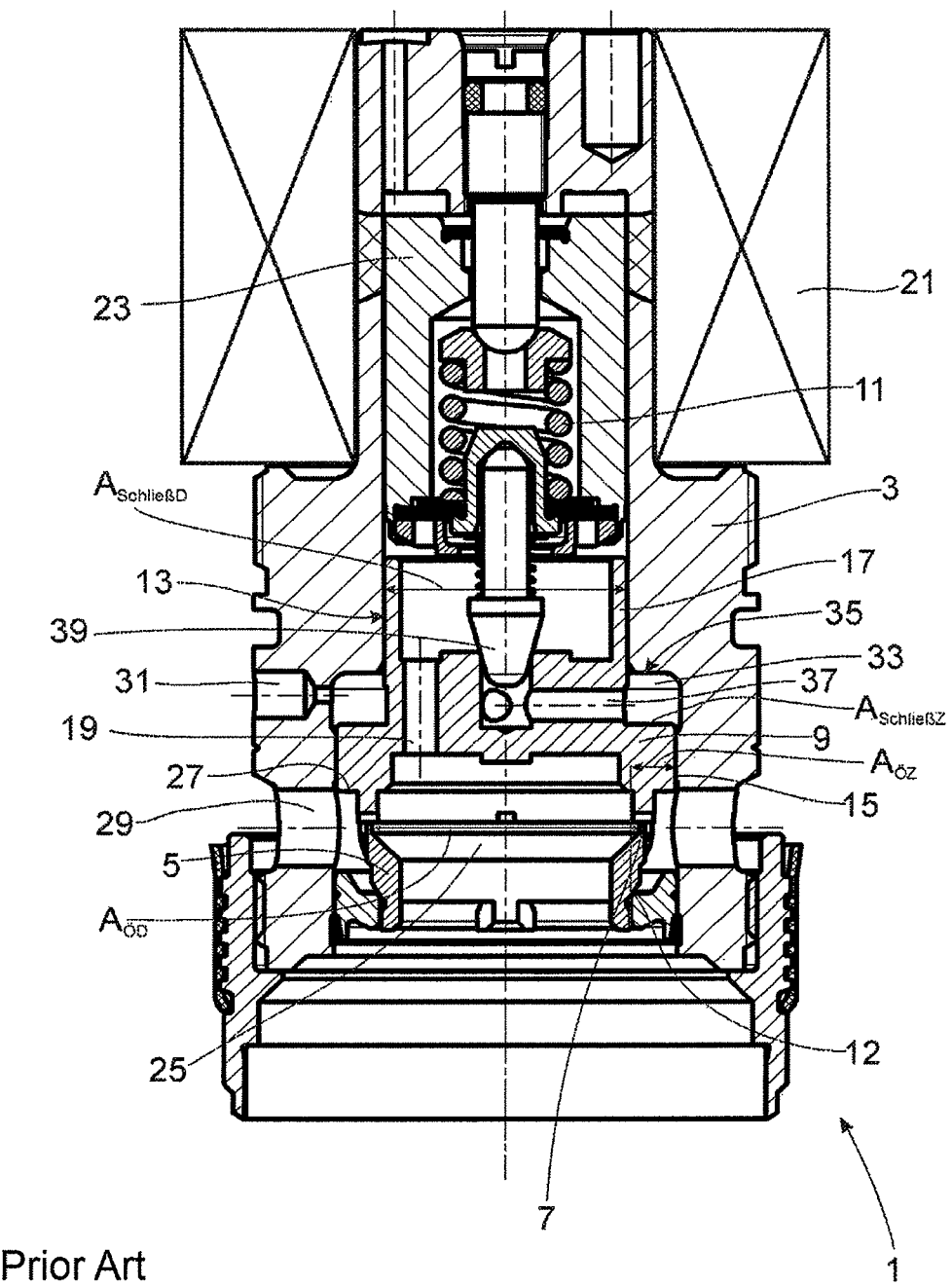
FIG. 1 is a damping valve according to the prior art.
Figure 2:
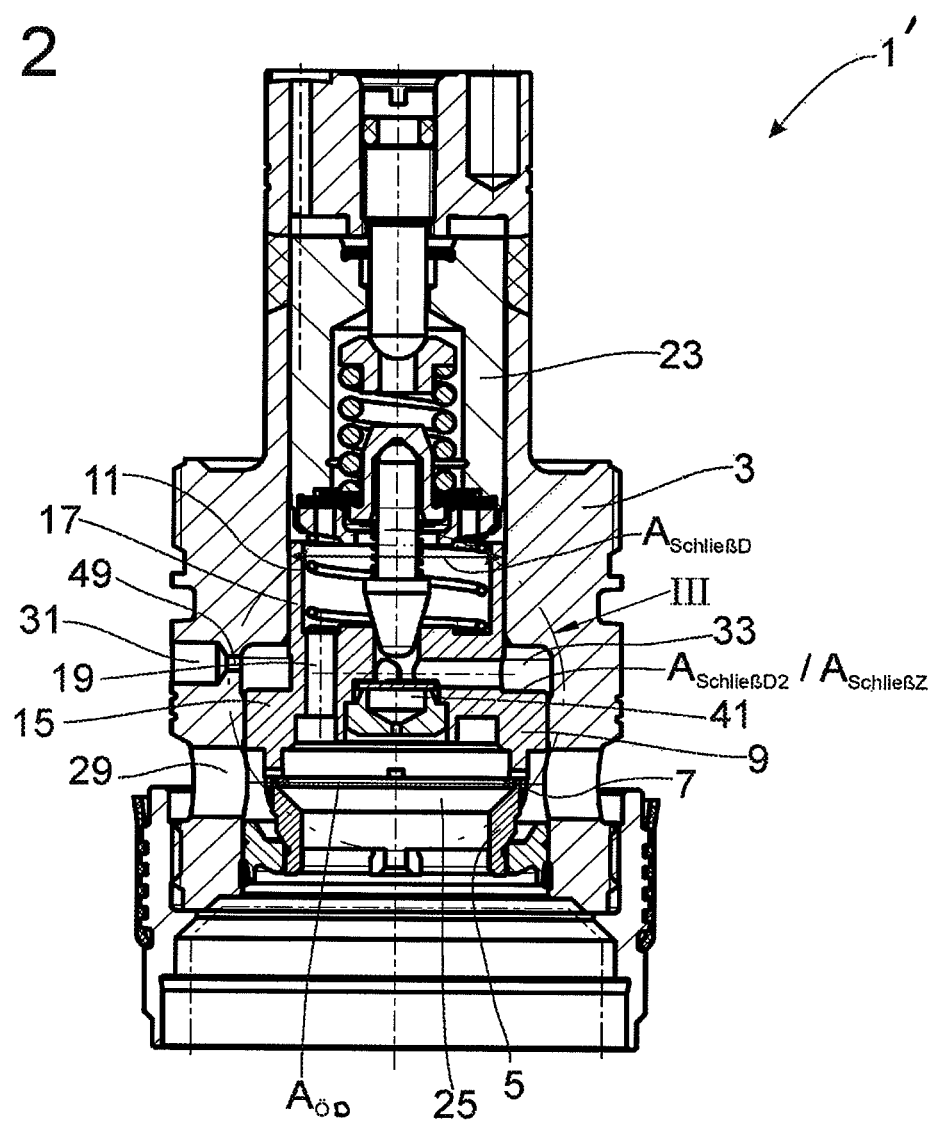
FIGS. 2 and 3 are a damping valve with an additional closing surface.
Figure 3:
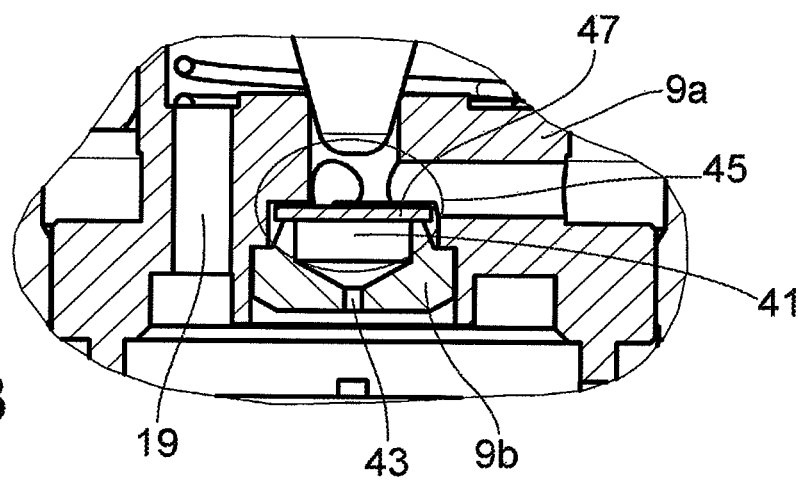

FIG. 2 in conjunction with FIG. 3 shows a first variant of a damping valve 1' according to the invention which is based on the construction according to FIG. 1. In the prior art described above, only the underside of the valve body 9 is available as pressure-loaded surface $A_{ÖD}$ in the opening direction for an incident flow through the through-opening 25. In said incident flow direction, only surface $A_{Schließ D}$ at the rear side of the valve body in the area of the guide sleeve 17 acts on the valve body 9 in the closing direction. In FIG. 2, an additional surface of the valve body 9 is acted upon by damping medium in the closing direction. The additional pressure-loaded surface $A_{Schließ D2}$ is formed by the shoulder 15 of the valve body 9 facing radially outward, i.e., by the same pressure-loaded surface which is operative during an incident flow via the radial channels 31 in the housing 3. The additional pressure-loaded surface $A_{Schließ D2}$ for this incident flow direction is connected to the through-opening 25 by a channel connection 41 in the valve body 9.

As can be seen particularly from FIG. 3, a throttle point 43 is constructed inside the channel connection 41. The channel connection 41 has a check valve 45 that closes in the direction of flow to the through-opening 25. The check valve 45 is formed by an axially movable check valve disk 47 arranged so as to be axially movable between two layered structural component parts 9a and 9b of the valve body 9 and controls a cross section of the channel connection 41.

The shoulder 15 of the valve body 9 and the stepped opening 13 of the housing 3 form the annulus 33 whose inlet and outlet is provided with another throttle point 49.

When damping medium flows against the valve body 9 via the through-opening 25, the surface $A_{ÖD}$ is acted upon by the opening pressure $p_Ö$. The damping medium can reach the rear side of the valve body 9 by way of the eccentric connection opening 19 and can exert a first force acting in the closing direction of the valve body 9 via the surface $A_{Schließ D}$. Parallel to this, damping medium enters the channel connection 41 via the throttle and flows through the opened check valve 45 in direction of the annulus 33, where the damping medium can load the shoulder 15 with the additional surface $A_{Schließ D2}$ of the valve body 9 by a pressure force in the closing direction. The pressure level on surface $A_{Schließ D2}$ is determined by the throttle resistance of the throttle point 43 in the valve body 9 and the other throttle point 49 between the annulus 33 and the channel 31. The spring force of the valve spring 11 and the magnetic force on the armature 23 remain unchanged compared to FIG. 1. The pressure $p_Ö$ within the through-opening 25 on the surface $A_{ÖD}$ acts on the valve body 9 in opening direction. In the closing direction, the pressure forces impinge on surface $A_{Schließ D2}$ with pressure $p_Ö$ and on surface $A_{Schließ D2}$ with a reduced pressure $p_{Schließ D}$. Compared to the prior art, an increased opening pressure $p_Ö$ which is multiplied by the fraction $A_{Schließ D2}$ and can be described by the reduced pressure $p_{Schließ}$ is needed in order to lift the valve body 9 from the valve seat surface 7 when the closing force of the valve spring 11 is fully in effect. The pressure increase that is achieved is proportional to an increased damping force. With a design of the valve spring 11 and magnet coil 21 which is unchanged in relation to the prior art, an appreciably greater spread of the possible damping force characteristics is achieved by an identical actuating force, i.e., the characteristic spread of the damping force is increased.

With incident flow on the valve body 9 via the radial openings 29 in the housing 3, there is no change in the characteristic spread of the adjustable damping force compared to the prior art described above, since the check valve 45 in the valve body 9 closes the channel connection 41, i.e., the identical pressure-loaded surfaces act in the opening direction and in the closing direction. The construction of the damping valve is simple in spite of the additional pressure-loaded surface $A_{Schließ\beta D2}$ with incident flow via the through-opening 25 because the pressure-loaded surface $A_{Schließ\beta D2}$ is operative with an incident flow via the through-opening inside the valve seat ring 7 and also with an incident flow via the radial channels 31, and no independent surface $A_{Schließ\beta D2}$ need be provided.

Figure 4:
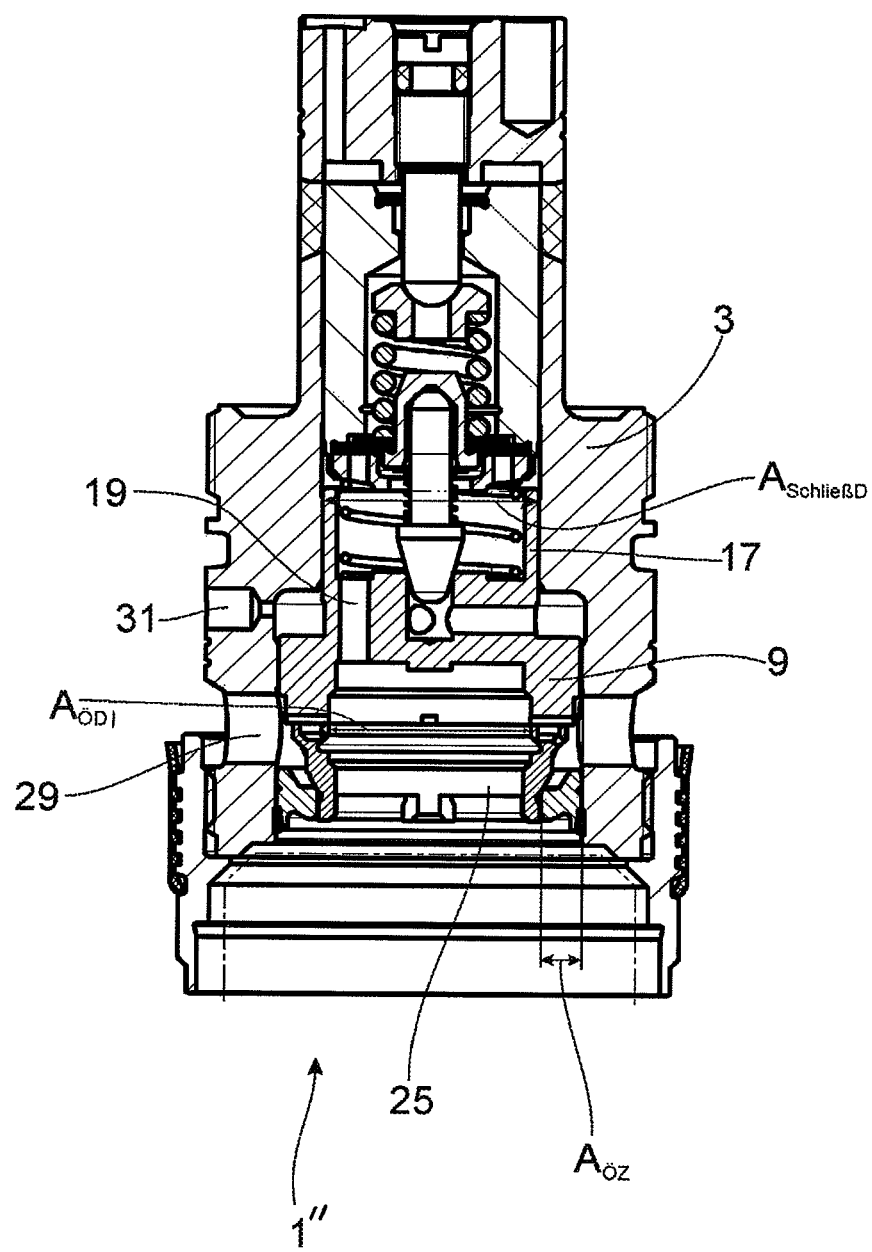
FIG. 4 is a damping valve at least two pressure-loaded surfaces in lifting direction.
Figure 5:
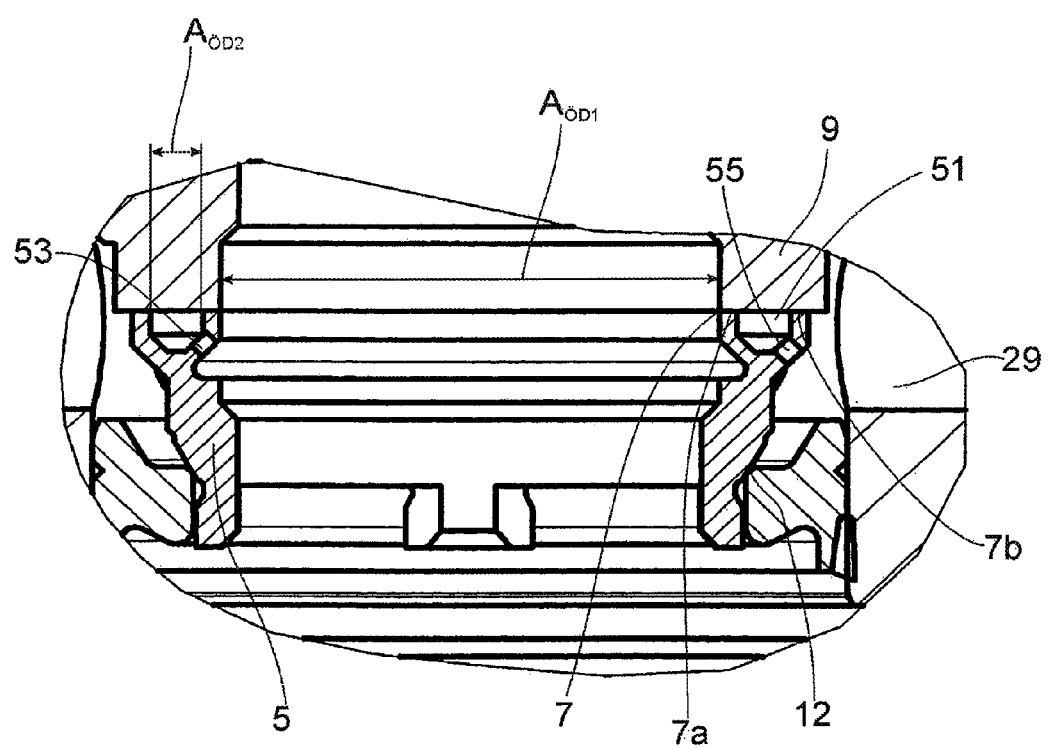
FIG. 5 is a detailed view from FIG. 4.

FIGS. 4 and 5 describe a damping valve 1" which is likewise based on the principle according to FIG. 1 and which has a pressure-loaded surface $A_{ÖD1}$ which is first operative in the lifting direction with an incident flow via the through-opening 25 and whose size is determined by the inner diameter of the contact surface between the valve body 9 and the valve seat surface 7. This first pressure-loaded surface $A_{ÖD1}$ is smaller than the closing surface $A_{Schließ\beta D}$ with a cross section corresponding to the diameter of the guide sleeve 17 of the valve body 9. A pressure force acts in lifting direction on the valve body 9 by a second pressure-loaded surface $A_{ÖD2}$ in connection with a pressure level which is reduced compared to the first pressure-loaded surface $A_{ÖD1}$ as shown in FIG. 5. The additional pressure-loaded surface $A_{ÖD2}$ is constructed between an inner valve seat surface 7a and outer valve seat surface 7b in the shape of an annular groove 51, although any other alternative shapes such as blind bore holes or pockets are also conceivable. An inlet throttle 53 between the supplying through-opening 25 and the additional pressure-loaded surface $A_{ÖD2}$ provides for a pressure reduction. An outlet throttle 55 in direction of the radial openings 29 in the housing 3 presents another possibility for determining the pressure at the additional pressure-loaded surface $A_{ÖD2}$. For a uniform pressure distribution on the additional pressure-loaded surface $A_{ÖD2}$, the inlet throttle 53 and outlet throttle 55 are arranged so as to be offset in circumferential direction so that the damping medium must completely pass through the annular groove 51.

With an incident flow of damping medium on the valve body via the through-opening 25, the damping medium is present at the underside of the valve body 9 with opening pressure $p_Ö$ and acts upon surface $A_{ÖD1}$. The damping medium with pressure $p_Ö$ is also present at the rear side with the pressure-loaded surface $A_{Schließ\beta D}$ of the valve body 9 via the connection opening 19. Parallel to this, damping medium flows into the annular groove 51 between the two valve seat surfaces 7a; 7b via the inlet throttle 53, wherein a reduced pressure $p_{Ö1}$ is in effect. The pressure $p_Ö$ needed to lift the valve body 9 is greater than in the prior art construction, so that the spread of the damping force characteristics is also increased.

The additional pressure-loaded surface $A_{ÖD2}$ also has an effect on an incident flow via the openings 29, but this effect can be compensated, e.g., by increasing the valve seat diameter at the valve seat surface 12 to make the pressure-loaded surface $A_{ÖZ}$ smaller (FIG. 4).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An adjustable damping valve for a vibration damper comprising:
    a valve body;
    a housing having a stepped opening in which the valve body is guided to be axially movable by a guide sleeve and a shoulder which is directed radially outward,
    wherein the valve body has a pressure-loaded surface in a direction of a valve seat surface and a contact surface between the valve body and the valve seat surface, the pressure-loaded surface acts in a lifting direction of the valve body and is impinged by an incident flow of a damping medium from a through-opening inside a cross section limited by the valve seat surface, and a surface that is operative with a diameter of the guide sleeve that is loaded by pressure in a closing direction formed by a rear side of the valve body;
    at least one valve spring and an actuator each configured to have respective forces that act on the valve body;
    an additional surface of the valve body that is pressure-loaded by the damping medium by the incident flow on the valve body via the through-opening in the closing direction of the valve body,
    a first channel arranged between the through-opening and a backside of the valve body; and
    a second channel arranged in the valve body that connects the additional pressure-loaded surface to the through-opening wherein the additional pressure-loaded surface is formed by the shoulder of the valve body facing radially outward.

2. The adjustable damping valve according to claim 1, wherein a first throttle point is formed inside the second channel connection.

3. The adjustable damping valve according to claim 1, wherein the shoulder of the valve body and the stepped opening form an annulus whose outlet is provided with a second throttle point.

4. The adjustable damping valve according to claim 1, wherein the second channel connection has a check valve that closes in the flow direction of the through-opening.

5. The adjustable damping valve according to claim 4, wherein the valve body comprises two layered structural component parts between which a check valve disk is axially movably arranged.

6. An adjustable damping valve for a vibration damper comprising:
    a valve body;
    a housing having a stepped opening in which the valve body is guided to be axially movable by a guide sleeve and a shoulder which is directed radially outward,
    wherein the valve body has a first pressure-loaded surface acting in a lifting direction that is smaller than a second surface that is pressure-loaded in a closing direction, and at least a third pressure-loaded surface that acts in the lifting direction that is acted upon by a pressure level that is reduced in comparison to the first pressure-loaded surface; and wherein the third pressure loaded surface is arranged between an inner valve seat surface and an outer valve seat surface.

7. The adjustable damping valve according to claim 6, wherein the third pressure-loaded surface is connected by an inlet throttle to a through-opening configured to supply the first pressure-loaded surface with a damping medium.

8. The adjustable damping valve according to claim 6, wherein the third pressure-loaded surface is formed by at least one annular groove.

9. The adjustable damping valve according to claim 6, wherein an outlet throttle adjoins the third pressure-loaded surface.

10. The adjustable damping valve according to claim 7, wherein the inlet throttle and an outlet throttle are constructed so as to be offset in circumferential direction.

\* \* \* \* \*